United States Patent [19]

Jacoby

[11] 4,386,129

[45] May 31, 1983

[54] POROUS POLYMERIC FILMS

[75] Inventor: Philip Jacoby, Naperville, Ill.

[73] Assignee: Standard Oil Company (Indiana), Chicago, Ill.

[21] Appl. No.: 249,673

[22] Filed: Mar. 31, 1981

[51] Int. Cl.³ .................... B32B 7/02; B32B 27/32; B28B 3/20
[52] U.S. Cl. .................. 428/215; 264/176 R; 428/220; 428/523; 521/56; 521/63; 521/90; 521/94; 526/348; 526/351
[58] Field of Search .................. 526/348, 351, 348.1; 428/220, 523, 215; 521/56, 63, 61, 64, 90, 94, 143; 264/176 R

[56] References Cited

U.S. PATENT DOCUMENTS

| | | |
|---|---|---|
| 3,607,793 | 9/1971 | Mahlman ............................. 521/61 |
| 3,839,240 | 10/1974 | Zimmerman ....................... 521/143 |
| 3,956,020 | 5/1976 | Weininger et al. ............... 521/61 X |
| 4,076,656 | 2/1978 | White et al. ......................... 521/64 |
| 4,185,148 | 1/1980 | Sato et al. ....................... 526/348.1 |

OTHER PUBLICATIONS

H. Leugering et al., Die Angew. Mapro. Chem., 33, 17 (1973).
Technology, Dec. 1978, C & EN, pp. 23-24.
A. A. Duswalt et al., Amer. Chem. Soc. Div. Org. Cont., 30, No. 2, 93 (1970), pp. 148-155.
H. Dragaun et al., Journal of Polymer Science, Vol. 15, (1977), pp. 1779-1789.
A. Jones et al., Makromal. Chem., 75, pp. 134-158, (1964).
H. Leugering, Makromal. Chem., 109, 204, (1967).

Primary Examiner—Thomas J. Herbert, Jr.
Attorney, Agent, or Firm—David E. Boone; William T. McClain; William H. Magidson

[57] ABSTRACT

This invention relates to porous films having pores with polygonal cross sections and average pore diameters of about 3 to about 100 microns and the method for preparing these films. More particularly this invention relates to a porous film having pores with polygonal cross sections and average pore diameters of about 3 to about 100 microns formed from a resinous polymer of propylene and the process for forming the film which comprises the steps of (a) forming a film containing beta-spherulites and (b) selectively extracting the beta-spherulites.

7 Claims, 5 Drawing Figures

POROUS POLYMERIC FILMS

This invention relates to a process for the preparation of porous polymer films and to porous films having pores with polygonal cross-sections (polygonal pores) which have average diameters of about 3 to about 100 microns. More particularly this invention relates to a process in which specific crystalline zones are formed in a film made from a resinous polymer of propylene followed by selective extraction of these crystalline zones to form pores with polygonal cross-sections and average diameters of about 3 to 100 microns.

Porous polymeric films are well known in the art. A common method of producing such films involves drawing or stretching a crystalline, elastic starting film in an amount of about 10 to 300 percent of its original length as exemplified by U.S. Pat. Nos. 3,426,754; 3,558,764; 3,679,538; 3,839,240; and 4,138,459. This drawing operation is claimed to produce a microporous film ordinarily having elongated, slit-like pores with a pore size less than 0.5 micron although U.S. Pat. No. 3,839,240 discloses a process for producing pores as large as 1.2 microns.

An alternative method of producing porous polymeric articles involves incorporating a material into the polymer which is later extracted to produce voids or pores in the article; for example, U.S. Pat. No. 3,956,020 of Weininger et al. dissolves a benzoate salt from the polymer article to form an ultrafine porous article. U.S. Pat. No. 4,076,656 of White et al. incorporates a water soluble particulate material and a channel forming water soluble liquid into a polymer and extracts with water; while in U.S. Pat. No. 3,607,793 of Mahlman, a hydrocarbon liquid is extracted from a polymeric gel.

However, these methods have the disadvantage of producing non-uniform pores of generally small size. Additionally these processes require large quantities of the additive material. Accordingly there is a need for a process which can produce porous films having larger pores which can be formed in an essentially uniform and controllable size.

An object of the instant invention is to provide a process for preparing porous films of resinous polymers of propylene.

Another object of the instant invention is to provide a process for forming films of resinous polymers of propylene having pores with polygonal cross-sections which are about 3 to about 100 microns in diameter.

Another object of the instant invention is to provide films of resinous polymers of propylene with a thickness of about 0.01 to about 0.25 millimeters having pores of polygonal cross-section with average diameters of about 3 to about 100 microns.

It has been found that the objects of the instant invention can be accomplished by preparing the porous film from resinous polymers of propylene capable of having at least 40% crystallinity by a process comprising the steps of (a) dispersing in said resinous polymer a nucleating agent capable of producing beta-spherulites, (b) forming a film with a thickness of about 0.010 to 0.25 millimeters from the molten product of step (a), (c) cooling said film below the crystallization temperature of said polymer to form beta-spherulites, and (d) selectively extracting said beta-spherulites from the cooled film product of step (c) to form the porous film product.

Figure 1:
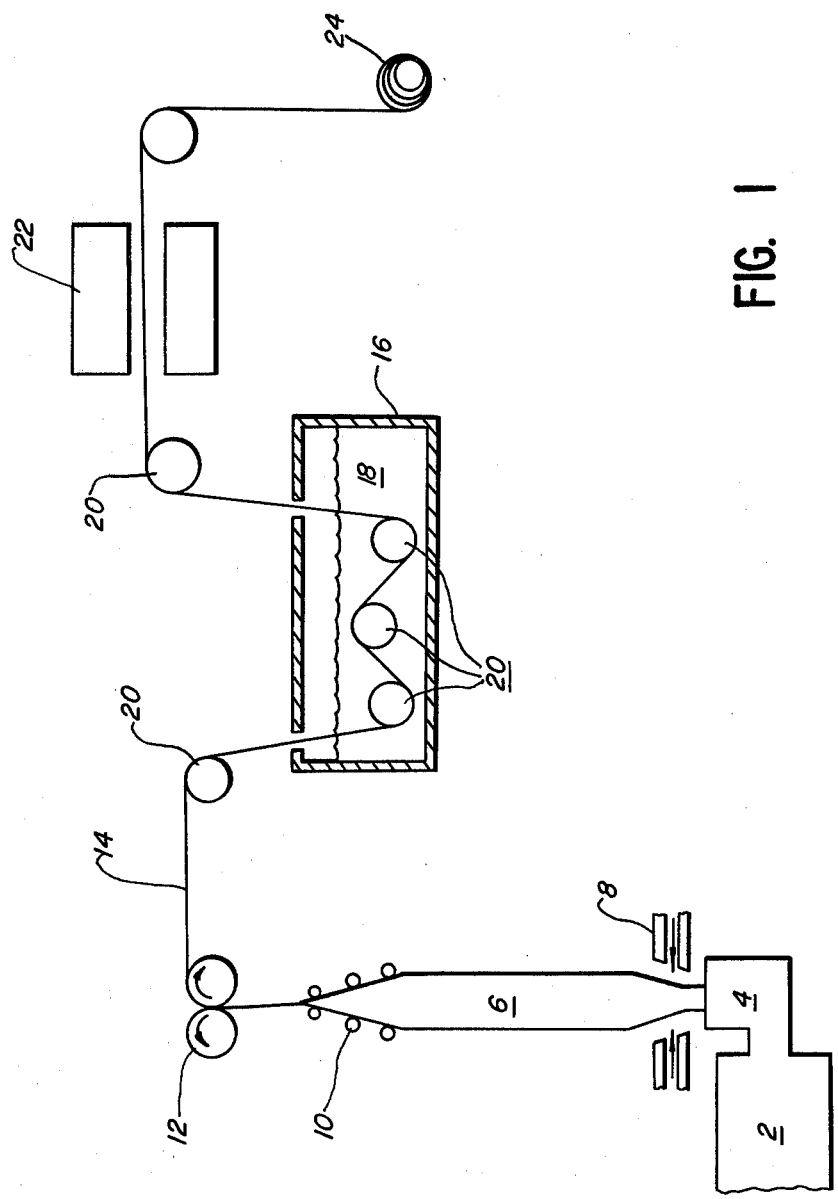
FIG. 1 is a schematic diagram showing the information of a porous film with a blown-bubble extrusion process.

As defined by Allen Sharples in *Introduction to Polymer Crystallization*, St. Martens Press, 1966, pages 12–16, a polymer spherulite is a birefringent entity, spherical in its symmetry, which can readily be seen to nucleate and grow in certain polymers, when the crystallization process is followed in an optical microscope. The spherulite itself is not a single crystal but it is instead an aggregate of smaller crystalline units. These smaller crystallites have dimensions on the order of $10^{-5}$ to $10^{-6}$ cm. while the spherulites are almost always greater than $10^{-4}$ cm. in size.

A characteristic feature of spherulitic structure is the presence of fibrous subunits. During spherulite growth these fibrils extend radially outwards from the central nucleus. These fibrils also undergo non-crystallographic branching leading to the volume filling structure of the spherulite. Non-crystalline polymer (amorphous material) is found in the inter-fibrilar and inter-spherulitic regions.

Many polymers are known to exhibit polymorphism which is the existence of more than one crystalline form. For resinous polymers of propylene crystallized from the melt, four distinctly different types of spherulites (observed in the optical microscope) can be formed. Two different crystal lattices are associated with their growth. Two of the spherulites, termed Type I and II, consist of the monoclinic crystal modification (alpha-form) whereas the other two, termed Types III and IV, consist of the hexagonal modification (beta-form).

Types I and II spherulites differ mainly in the sign of their birefringence, with Type I being weakly positive and Type II being weakly negative. Both Type I and Type II spherulites melt at 168° C., i.e., the melting point of the monoclinic crystal modification. Type III spherulites have a large negative birefringence which is much greater than that of Types I and II and causes these spherulites to appear bright under crossed polars in an optical microscope. The Type III and Type IV spherulites are herein referred to as "beta-spherulites", "beta-form", "beta-phase", or "beta-crystals". Type IV spherulites have a banded appearance. Both Types III and IV spherulites melt at 150° C., i.e., the melting point of the hexagonal crystal modification.

The physical properties of the beta-form on a macroscopic level have not been well documented because of the difficulties in producing samples containing substantial quantities of this crystal form. The beta-form is known to be less stable than the alpha-form since under tensile stress the beta-form will spontaneously convert to the alpha-form.

A property of the beta-form which is critical to the instant invention is the ability of certain organic solvents to selectively dissolve out the beta-spherulites while removing only minor amounts of the alpha-spherulites. This response was first noted in the literature by H. J. Leugering, (Makromol. Chem. 109, 204 (1967)). Sato et al. in U.S. Pat. No. 4,185,148 used this property to determine the size and distribution density of beta-form crystals formed on the surface of a polypropylene film.

Several procedures are known for preferentially inducing the formation of the beta-form spherulites. H. J. Leugering et al., (Die Angew. Makro. Chem., 33, 17 (1973)) and H. Dragaun et al. (J. Polym. Sci., 15, 1779 (1977)) disclose the formation by crystallizing from a melt undergoing shear deformation. A. J. Lovinger et al. (J. Polym. Sci., 15, 641 (1977)) disclose the formation of beta-form by zone-crystallization in a temperature gradient. H. J. Leugering (Makromol. Chem., 109, 204 (1967)) and A. Duswalt et al. (Amer. Chem. Soc. Div. Org. Coat., 30, No. 2, 93 (1970)) disclose the use of certain nucleating agents to cause the preferential formation of beta-form spherulites.

A process for producing a polypropylene film having a surface layer of beta-form crystals is disclosed by Sato et al. In that process the film is extruded through a thermal gradient such that one side of the film cools at a much more rapid rate than the other thereby producing beta-crystals on the cooled side. The resulting film is then biaxially stretched to produce a film having a rough surface and which is air-tight.

In the practice of the instant invention, it is preferred that nucleating agents be used to produce the beta-form spherulites. The use of nucleating agents provides the beta-form spherulites in a more controlled distribution and size than the other hereinabove described methods. In order to obtain a final porous film in which the pores are well distributed and of the desired size, it is critical that the distribution and size of the beta-form spherulites are controlled.

As discussed by Duswalt et al., only a few materials are known to preferentially nucleate beta-form spherulites. These known beta-nucleators include (a) the gamma-crystalline form of a quinacridone colorant, Permanent Red E3B having the structural formula

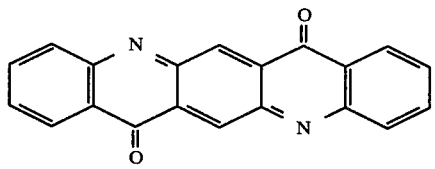

herein referred to as "Q-dye";

(b) the bisodium salt of o-phthalic acid;

(c) the aluminum salt of 6-quinizarin sulfonic acid; and to a lesser degree (d) isophthalic and terephthalic acids. The preferred beta-nucleant in the instant invention is Q-dye.

The amount of nucleant which is useful in the instant invention depends on the effectiveness of the particular nucleant in inducing beta-crystals and the amount of porosity desired in the film product. Other things being equal as the level of nucleant is increased the amount of beta-crystallinity increases resulting in larger pore size and increased pore volume upon extraction. The amount of Q-dye useful in the process of the instant invention ranges from about $10^{-2}$ to about $10^{-6}$ parts by weight of Q-dye per 100 parts by weight of base resin. The term "base resin" is used herein to mean the resinous crystalline polymer of propylene together with any additives such as u.v. stabilizers, antioxidants, halide scavenger, colorants, and fillers which might be utilized. Preferably about $10^{-3}$ to about $10^{-5}$ parts by weight of Q-dye per 100 parts by weight of base resin is utilized. Other things being equal, less than about $10^{-6}$ parts of Q-dye per 100 parts by weight of base resin has a negligible effect on the level of beta-form present in the film; whereas, about $10^{-3}$ parts by weight of Q-dye per 100 parts by weight of base resin produces a film having about 40% porosity upon extensive extraction.

The resinous polymers of propylene useful in the instant invention are capable of having at least 40% crystallinity and preferably at least 50% crystallinity as determined by x-ray diffraction analysis. Suitable resins include not only propylene homopolymers but also copolymers of propylene with up to about 20 mol percent of other alpha-olefins. The resin may have any degree of polymerization so long as it is capable of being melt-extruded to form a film, although it is preferable that it have a melt index of about 0.5 to 20 as measured at 230° C. under a load of 2.16 kg as specified in ASTM D1238-70.

The nucleating agents are ordinarily used in the form of powdered solids. To efficiently produce beta-crystallites the powder particles should be less than 5 microns in diameter and preferably no greater than 1 micron in diameter.

The nucleant can be dispersed in the base resin by any of the procedures normally used in the polymer art to thoroughly mix a powder in a polymeric resin. For example, the nucleant can be powder blended with base resin powder or pellets. The nucleant can be slurried in an inert medium and the slurry used to impregnate base resin powder or pellets. Alternatively, mixing at elevated temperatures can be accomplished using, for example, a roll mill or multiple passes through an extruder. A preferred mixing procedure is to powder blend nucleant with base resin pellets and then pass this mixture through an extruder. Multiple passes may be necessary to give the desired level of dispersion of the nucleant. Ordinarily this procedure would be used to form a masterbatch of pelletized resin containing sufficient nucleant so that when blended with base resin the desired level of nucleant is obtained in the final product.

The base resin containing the beta-nucleant can be formed into a film by any of the processes known in the film forming art which are suitable for use with crystalline polypropylene. A number of film-forming processes are described in the *Kirk-Othmer Encyclopedia of Chemical Technology*, third edition, volume 10, pages 232–245, which is incorporated herein by reference. Of the known processes, melt-forming processes are of particular utility with the slot-die extrusion and blown-bubble extrusion processes being preferred.

A critical parameter in the formation of a film containing beta-spherulites is the rate at which the molten resin is cooled after it is formed into a film. Other things being equal, the more rapid the cooling the smaller the size of the beta-spherulites which are formed. If the molten film is cooled too rapidly, it is possible that essentially no spherulites be formed. Conversely, the slower the molten resinous film is cooled the larger the size of the spherulites which form. It has been reported by Duswalt et al. (supra) and A. Turner Jones et al. (Makromol Chem., 75, 134–158 (1964)) that beta-spherulites are formed at crystallization temperatures between about 80° C. and 130° C. with the optimum range being about 100° C. to about 125° C. Little or no beta-spherulites are formed below about 80° C. or above about 130° C. Duswalt et al. also reported the effect of cooling rate on the amount of beta-spherulites formed at different levels of nucleant. The optimum cooling rate was reported to be about 5° C. to about 40° C. per minute with significant amounts of beta-spherulites produced at a cooling rate of 80° C. per minute at nucleant concentrations of $10^{-6}$ to $10^{-3}$ parts nucleant by weight per 100 parts of resin.

In the blown-bubble process, the film is preferably cooled with a stream of air. In the slot-die extrusion process, the cooling can be accomplished with a liquid cooling bath, chill roll or stream of air. The chill roll is commonly used for the cast film process. The cooling conditions needed to achieve the desired beta-spherulite size can be controlled using one or more of the following parameters: polymer melt temperature; extrusion rate; drawdown ratio; die gap (in extruded film); cooling air velocity and temperature (in blown film); and chill roll temperature (in cast film). Other things being equal, an increase in one of the following of these parameters results in a decrease in the rate the molten film is quenched (cooled) and consequently an increase in the size of the beta-spherulites formed: polymer melt temperature; extrusion rate; die gap; cooling air temperature; or chill roll temperature. Conversely, other things being equal, a decrease in one of these variables results in a decrease in the size of the beta-spherulites. By contrast, an increase in either the drawdown ratio or cooling air velocity results in an increase in the quench rate and an associated decrease in the size of beta-spherulites if other things are equal.

The film of the instant invention is ordinarily thicker than about 0.25 mils (0.00635 millimeters). The useful maximum thickness depends on the time of extraction of the beta-spherulites. Other things being equal, the thicker the film the longer the time required to extract a certain percentage of the total beta-spherulites present. Preferably the thickness of films produced by the instant invention ranges from about 0.25 mils to about 7 mils (0.178 millimeters) in thickness.

The beta-spherulites can be extracted with nonpolar, organic solvents. For ease of operation in the process of the instant invention, it is preferred that the extracting medium have a boiling point greater than about 100° C. It is possible to utilize mixtures of two or more organic solvents and in such an event the lower boiling solvent should have a boiling point greater than about 100° C. Preferred extracting materials include toluene, carbon tetrachloride, and xylene with toluene being most preferred.

The extraction conditions are critical in selectively removing at least a portion of the beta-spherulites while minimizing the amount of alpha-form crystalline polypropylene removed. Removal of the beta-form crystals is very temperature dependent. If the extraction temperature is too low, the beta-spherulites are removed too slowly or not at all. When the extraction temperature is too high, alpha-form crystals are dissolved along with the beta-form. The optimum temperature of extraction depends on the particular extraction medium used and can be readily determined by one skilled in the art. For the preferred extracting medium, toluene, the extraction is ordinarily accomplished in the temperature range of about 90° C. to about 110° C., most preferably about 95° C. to about 100° C.

As expected, there is a relationship between the extraction temperature and the extraction time. The extraction time is used herein to mean the time the film contacts the extracting medium at the extraction temperature. Other things being equal, the higher the extraction temperature the shorter the extraction time; conversely, the lower the extraction temperature the longer the film must be contacted with the extraction medium to remove a given amount of beta-spherulites. The length of the extraction time can be used to control the degree of porosity to some extent since at a given extraction temperature greater quantities of the beta-spherulites can remain in the film as the extraction time is decreased. It is preferred that at least 20 percent of the beta-spherulites are extracted as measured by x-ray diffraction. The extraction time also depends on the thickness of the film being extracted. At a given temperature, the extraction time increases as the film becomes thicker. Ordinarily the extraction time ranges from about 3 to about 30 minutes. The optimum extraction time for a particular film thickness, beta-form content and extraction temperature can be readily determined by a person skilled in the polymer fabrication art.

The shape and location of the beta-spherulites present in the film determines the shape and location of the pores which are produced by extraction as discussed hereinabove. Since the spacial form of the beta-spherulites has a polygonal cross-section, the pores formed by the instant process have cross-sections which are polygonal, that is, the cross-sections of the pores have the shape of plane figures bounded by straight lines. The term "polygonal pores" is used herein to mean pores which have cross-sections which can be described as polygons.

As discussed in more detail hereinbelow, the pore size, pore size distribution, and pore volume are determined for purposes of this application by mercury intrusion porosimetry. The term "pore size" is used herein as an equivalent to the term "average pore diameter." The mercury porosimetry measurements show that at least 50 percent and generally at least 70 percent of the pores have average pore diameters greater than 5 microns. The diameters of the pores can also be measured by using a ruler on photomicrographs obtained by scanning electron microscope. These measurements are more subjective in that the distance across the pore is measured at several points and averaged and also the number of pores which can be observed is a small fraction of the total number of pores. This type of measurement, however, indicates that more than 75 percent of the pores have openings with average diameters in the range of 20 to 60 microns.

With reference to FIG. 1, a mixture of base resin and nucleant is formed into a melt in extruder 2. The melt temperature is in the range of about 180° C. to about 270° C., preferably about 200° C. to about 240° C. The melt is fed into an annular die 4 from which the melt is extruded as a tube. Commonly, the annular die opening ranges from about 0.25 to about 5 millimeters. While FIG. 1 shows the tube being extruded upward, it is well-known in the art that it can be extruded horizontally or downward. As the extruded tube emerges from the die and starts to cool, it is inflated by air to form expanded tube or "bubble" 6 having a size dictated by the film properties desired although commonly this blow-up ratio (initial tube diameter to final tube diameter) is about 0.5 to about 6.0, preferably about 1.0 to about 2.5. The bubble can be cooled by an external air ring 8 and also by an internal air ring not shown. The rate of air flow and air temperature can be used to control the rate of cooling of the film and thereby the size of the betaspherulites as discussed hereinabove. The cooled bubble 6 travels into a V-shaped frame having flattening rolls 10 which collapse the bubble into a flat tube. A set of nip rolls 12 draw the film away from the die 4.

The flat film tube 14 passes into an extraction vessel 16 which contains the non-polar solvent 18 used to selectively extract the beta-crystallites as discussed hereinabove. A series of rollers 20 are used to maintain tension in the film. The extraction vessel can be equipped with heating means, preferably steam traced lines, capable of maintaining the extraction solvent at the preferred extraction temperature. Any commercially available controlling means can be employed to control the temperature of the extracting solvent preferably to within 1° F. The extraction vessel 16 can also be equipped with a means (not shown) for introducing fresh extracting solvent into the vessel and removing spent solvent containing dissolved resin from the vessel. A preferred method of controlling the temperature of the extraction bath is to control the temperature of the fresh solvent added to the vessel. The spent solvent can be passed into a recovery section (not shown) where the solvent can be separated from the dissolved resin, for example, by flashing the solvent and condensing the vapor. The recovered polymer containing nucleant can be blended in appropriate amounts with fresh base resin and used to produce film.

The extracted film is transported through a drying station 22 to remove any extraction solvent which remains with the film. The drying station can be any means commonly used in the art to remove materials such as the extraction solvents. Devices such as radiant heaters can be employed with the preferred drying method utilizing a blower for impinging heated air on the film.

With both the drying station and the extraction vessel, environmental procedures involved in handling the extraction solvent can be utilized. It is preferred that both the extraction vessel 16 and the drying station 22 be contained by a housing equipped with the necessary exhaust and volatile treatment facilities to minimize loss of the extraction solvent to the environment.

The extracted and dried film is wound onto a take-up roll 24.

As discussed in detail in the Examples, the films produced by the instant process have high vapor porosity and non-wetting characteristics. These properties are of great importance in certain applications. Obvious examples of this are in raincoats, backpacking gear, tents, sleeping bags, etc. where the objective is to keep out the rain without keeping in perspiration. A commercial porous film known as "Gore-Tex" made from polytetrafluoroethylene is already being used in these specific applications. The "Gore-Tex" film, however, lacks durability and must be laminated to conventional fabrics. The film prepared from a resinous polymer of propylene is quite durable and strong and would not have to be laminated. Resinous polymers of propylene also offer considerable economic advantages over polytetrafluoroethylene.

The following examples are illustrative of this invention but do not indicate limitation upon the scope of the claims.

EXAMPLE 1

The polypropylene resin used was a homopolymer from Amoco Chemicals Corporation which had a melt flow rate of about 9.6 g/10 min. as determined by ASTM test D1238-70. The following additives were combined with the resin: about 0.1 wt% butylated hydroxytoluene (BHT); about 0.15 wt% distearlthiodipropionate (DSTDP); and about 0.075 wt% calcium stearate. The resulting pelletized polypropylene resin (base resin) was combined with varying quantities of quinacridone dye as the beta-nucleant (hereinafter designated "Q-dye") by three procedures.

Powder Blending

In this procedure 50 g (gram) of the base resin pellets were ground in a Wiley mill using a 20 mesh screen. The resulting powder was designated sample PB-O. To this powder were added 5.0 mg (milligram) of the Q-dye and the mixture was thoroughly agitated for approximately 15 minutes at which point the Q-dye appeared to be well dispersed as evidenced by the uniform red color of the mixture. The resulting sample which contained $10^{-2}$ parts by weight of Q-dye per 100 parts by weight of base resin was designated PB-2. 5 g of the PB-2 mixture were combined with 45 g of base resin powder (as prepared above) to yield sample PB-3 which contained $10^{-3}$ parts by weight Q-dye per 100 parts by weight base resin. Successive dilutions were made in the same manner to produce the following designated samples with the indicated levels of Q-dye (in parts by weight Q-dye per 100 parts base resin): PB-4 ($10^{-4}$); PB-5 ($10^{-5}$); and PB-6 ($10^{-6}$).

Roll Milling

A second set of samples was blended as described hereinabove for the powder blended samples and each sample was then homogenized on a laboratory roll mill (Farrell 2-roll mill) for 3 minutes at 180° C. The resulting samples were designated RM and contained Q-dye as given in Table I.

Extruder Blending

A third set of samples was prepared by adding 50 g of a mixture prepared as PB-1 to 4.95 Kg (kilogram) of base resin pellets and stirring manually in a large bucket. This material was then passed two times through a 1 ¾ inch Prodex extruder at a melt temperature of 440° F. The resulting blend containing $10^{-3}$ parts by weight of Q-dye per 100 parts of base resin was designated EB-3. Blends EB-4 ($10^{-4}$ parts Q-dye) and EB-5 ($10^{-5}$ parts Q-dye) were similarly prepared from master batches with compositions corresponding to samples PB-2 and PB-3 respectively. Base resin containing no Q-dye was doubly extruded as a control and was labeled EB-0.

Each of the above described samples was compression molded into a 60 mil thick plaque in a Wabash hydraulic compression molding press (Model No. 12-10-1T) by applying about one ton pressure for 45 seconds and then 10 tons pressure for about 5 minutes at about 200° C. Each molded plaque was then cooled to room temperature in the mold at about 15° C. per minute by passing water through the press with the sample being removed at about 65° C.

The amount of beta-crystalline form in each of the samples was determined by x-ray diffraction. The x-ray diffraction method used was that described by A. Turner Jones, et al., *Makromol Chem.*, 75, 134–158

(1964). The beta-crystalline form of polypropylene is known to exhibit a strong diffraction maximum (Miller indices of 300) labeled $H_{beta}$ occurring at 5.495 Angstrom while the alpha-crystalline form has three strong equatorial peaks with Miller indices of (110), (040), and (130) labeled $H_{alpha\,1}$, $H_{alpha\,2}$, and $H_{alpha\,3}$ respectively. An empirical ratio $K_x$ defined as $$K_x = \frac{H_{beta}}{H_{beta} + H_{alpha\,1} + H_{alpha\,2} + H_{alpha\,3}}$$

has been used to quantify the amount of beta-form present. Although this ratio varies from 0 for no beta-form to unity for 100% beta-form, it is not an absolute measure of the proportion of beta-crystallinity present.

The overall percent crystallinity of the samples was estimated by measuring the area under the crystalline diffraction peaks and dividing this area by the total area under the crystalline and amorphous background curve.

The volume fraction, $K_v$, occupied by beta-spherulites was determined by measuring the fraction of the surface area of the sample occupied by beta-spherulites using the point count method discussed in *Quantitative Microscopy*, edited by R. T. DeHoff and F. N. Rhines, McGraw-Hill Book Co. (1968). The number of points can be measured by using depolarized light intensity or partial extraction to determine the location of each beta-spherulite in the surface of the sample, i.e., determine the number of beta-spherulites per unit area. Assuming an isotropic sample, the fractional area occupied by beta-spherulites is proportional to the volume fraction of the sample occupied by beta-spherulites as discussed in the DeHoff and Rhines book. The values for $K_v$ are given in Table I for the samples. Multiplying the numbers given by 100 gives the approximate volume percent of the sample occupied by beta-spherulites.

An indication of the amount of beta-form crystals present was also obtained by using a depolarized light intensity (DLI) method. The sample was heated at 120° C. to allow for complete crystallization (as indicated by no further increase in light intensity). After crystallization was complete, the sample was heated at a rate of 10° C./minute to 185° C. to completely melt the sample. The metastable beta-phase was observed to melt in the vicinity of 150° C. while the more stable alpha-phase melted at about 162° C. The optical melting point is defined herein as being the temperature at which the light intensity has dropped to a point that is midway between the pre- and post-melting light intensity. The relative amount of beta-form present is determined from the ratio $K_{DLI} = I_{beta}/I_{total}$ where $I_{beta}$ is the light intensity change due to the melting of the beta-phase and $I_{total}$ is the total light intensity change following complete melting of the sample. The ratio $K_{DLI}$ is not, however, an absolute measure of beta-form content but rather is strongly weighed toward high values of beta-form because the beta-spherulites have a much higher birefringence than the alpha-spherulites and therefore cause a disproportionally large change in light intensity when they melt.

The results of analysis by x-ray and depolarized light intensity (DLI) method are given in Table I for each of the above-described samples.

TABLE I

| Sample | Quantity[a] of Q-dye | Fraction of beta-form $K_x$ | $K_y$ | $K_{DLI}$ | % Crystallinity |
|---|---|---|---|---|---|
| PB-2 | $10^{-2}$ | 0.73 | 0.672 | 0.83 | 64[b] |
| PB-3 | $10^{-3}$ | 0.63 | 0.583 | 0.51 | 62 |
| PB-4 | $10^{-4}$ | 0.56 | 0.482 | 0.29 | 59 |
| PB-5 | $10^{-5}$ | 0.15 | 0.118 | 0.20 | 62 |
| PB-6 | $10^{-6}$ | 0.12 | 0.131 | 0.23 | 61 |
| PB-0 | none | 0.10 | 0.093 | 0.15 | 65 |
| RM-2 | $10^{-2}$ | 0[c] | — | 0.35 | 68 |
| RM-3 | $10^{-3}$ | 0 | — | 0.35 | 67 |
| RM-4 | $10^{-4}$ | 0.14 | — | 0.41 | 64 |
| RM-5 | $10^{-5}$ | 0.22 | — | 0.32 | 64 |
| RM-6 | $10^{-6}$ | 0.11 | — | 0.16 | 62 |
| RM-0 | none | 0.07 | — | 0.15 | 64 |
| EB-3 | $10^{-3}$ | 0.54 | 0.383 | 0.44 | 64 |
| EB-4 | $10^{-4}$ | 0.28 | 0.236 | 0.20 | 64 |
| EB-5 | $10^{-5}$ | 0 | 0.014 | 0.18 | 66 |
| EB-0 | none | 0.05 | 0.018 | 0.20 | 65 |

[a] Parts by weight of Q-dye per 100 parts by weight of base resin.
[b] The uncertainty in this value is greater than that of the other samples due to the high beta-content.
[c] The $K_x$ values for the RM series of samples are high because the beta peak (300) was not completely resolved. Consequently, $K_y$ could not be determined.

These results show that for the powder blended (PB) samples and the extruder blended (EB) samples as the quantity of Q-dye was increased the level of beta-form crystallinity increased.

In the roll-milled samples, the absence of beta-crystallinity in the RM-2 and RM-3 (as determined by x-ray) is in contrast to the high levels of beta-crystallinity of samples PB-2 and PB-3. These results show that there is an optimum level of Q-dye to produce the maximum amount of beta-form. This is apparently related to the ability of the Q-dye to nucleate both the alpha and beta crystalline forms in conjunction with the different relative rates of growth of the two crystalline forms at different temperatures. The roll milling operation apparently gave a more uniform distribution of Q-dye particles than either the powder or extrusion blending operations which amplified the crystallization rate effects.

EXAMPLE 2

Compression Molded Film

Portions of the four extrusion blended (EB) samples described hereinabove were compression molded into 6 mil thick films. The films were molded at about 215° C. by placing the sample under one ton pressure for 45 seconds and then 10 tons pressure for about 5 minutes. The film was then cooled at about 15° C. per minute to a temperature of 65° C. and then removed from the press.

Multiple films from each sample (designated A, B, C) were extracted by immersion in toluene at about 95.5° C. for 90 minutes. The temperature was maintained within about a 1° C. range. The amount of polymer extracted was determined by weight differential between starting and extracted film. The results are given in Table II.

TABLE II

| Film Sample | Quantity of Q-Dye | Polymer Extracted (Weight %) |
|---|---|---|
| EB-0-A | None | 9.5 |
| EB-0-B | None | 5.9 |
| EB-0-C | None | 6.8 |
| EB-5-A | $10^{-5}$ | 10.2 |
| EB-5-B | $10^{-5}$ | 9.5 |

TABLE II-continued

| Film Sample | Quantity of Q-Dye | Polymer Extracted (Weight %) |
| --- | --- | --- |
| EB-4-A | $10^{-4}$ | 24.7 |
| EB-4-B | $10^{-4}$ | 18.4 |
| EB-3-A | $10^{-3}$ | 35.0 |
| EB-3-B | $10^{-3}$ | 25.2 |
| EB-3-C | $10^{-3}$ | 31.8 |

The amount of Q-dye is given as parts by weight Q-dye per 100 parts by weight base resin.

The results in Table II show the amount of polymer extracted by toluene over a 90-minute interval. The differences in the weight percent of polymer extracted in re-runs of films from a given sample are believed due primarily to variations of as much as 1° C. in the temperature of the toluene extracting medium. As can be readily seen from Table II, the amount of polymer extracted increased as the level of Q-dye increased. As discussed hereinbelow, the extracted polymer was predominantly beta-form crystals.

A 1.6 mil thick film was compression molded from the EB-3 sample as described above. There was a 29 weight percent loss when the film was extracted with toluene at 95° C. for 64 minutes.

Figure 2:
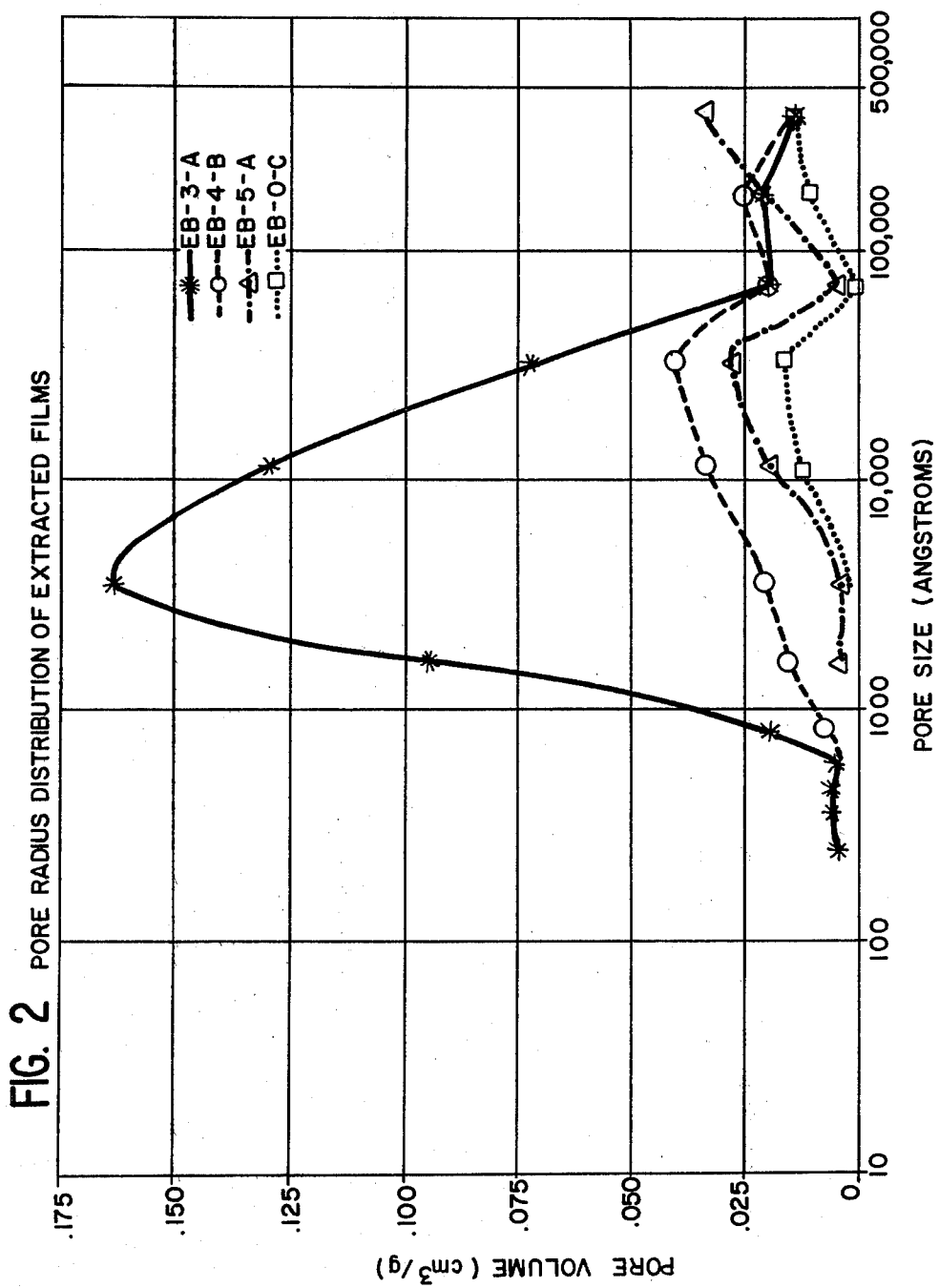
FIG. 2 shows pore radius distribution data from Example 2.

The pore size, pore size distribution and pore volume were determined for an unextracted film sample EB-3 and four extracted film samples EB-0-C, EB-5-A, EB-4-B and EB-3-A. These pore measurements were made by standard high pressure (60,000 pounds per square inch) mercury intrusion porosimetry using the procedure recommended by the manufacture of the instrument, The American Instrument Company of Silver Springs, Maryland. Fractional pore volumes in the size range of $2 \times 10^{-3}$ to 50 microns were measured and the data is given in Table III. A plot of the midpoint of the radius range vs. the pore volume for that range for the extracted samples is given in FIG. 2. The average pore diameter was determined by multiplying this midpoint in the radius range times 2. Cumulative pore volumes together with the weight % of polymer extracted are given in Table IV.

TABLE III

| Pore Radius Range (Angstroms) | Pore Volume[1] Film Samples | | | | |
| --- | --- | --- | --- | --- | --- |
| | EB-3[2] | EB-0-C | EB-5-A | EB-4-B | EB-3-A |
| 300,000–500,000 | 0.0073 | 0.0132 | 0.0342 | 0.0125 | 0.0136 |
| 100,000–300,000 | 0.0094 | 0.0112 | 0.0218 | 0.0240 | 0.0210 |
| 50,000–100,000 | 0.0010 | 0.0010 | 0.0093 | 0.0211 | 0.0189 |
| 20,000–50,000 | 0.0039 | 0.0161 | 0.0191 | 0.0408 | 0.0735 |
| 5,000–20,000 | 0.0020 | 0.0128 | 0.0029 | 0.0340 | 0.1316 |
| 2,500–5,000 | 0.0003 | 0.0029 | 0.0044 | 0.0209 | 0.1634 |
| 1,000–2,500 | 0.0002 | 0.0032 | 0.0034 | 0.0154 | 0.0961 |
| 600–1,000 | 0.0001 | 0.0017 | 0.0010 | 0.0075 | 0.0208 |
| 500–600 | 0.0000 | 0.0010 | 0.0010 | 0.0022 | 0.0061 |
| 400–500 | 0.0000 | 0.0010 | 0.0010 | 0.0023 | 0.0070 |
| 300–400 | 0.0000 | 0.0014 | 0.0005 | 0.0023 | 0.0070 |
| 250–300 | 0.0000 | 0.0009 | 0.0003 | 0.0011 | 0.0053 |
| 225–250 | 0.0000 | 0.0005 | 0.0009 | 0.0006 | 0.0029 |
| 200–225 | 0.0000 | 0.0005 | 0.0012 | 0.0001 | 0.0029 |
| 175–200 | 0.0000 | 0.0005 | 0.0012 | 0 | 0.0029 |

[1]Pore volume in cubic centimeters per gram.
[2]Unextracted film.

TABLE IV

| Sample | Cumulative Pore Volume (cm³/g) | Polymer Extracted (Wt %) |
| --- | --- | --- |
| EB-3 | 0.0472 | 0 |
| EB-0-C | 0.1325 | 6.8 |
| EB-5-A | 0.1990 | 10.2 |
| EB-4-B | 0.2502 | 18.4 |
| EB-3-A | 0.6652 | 35.0 |

These results show the effect of the level of Q-dye on pore size, pore size distribution and pore volume. Larger pores were made and the pore volume increased with the level of Q-dye, i.e. beta-nucleant, present in the polymer. The reason for the high pore volume measured in film EB-3-A is not known but may be due to interconnected pore structure.

Film sample EB-3-C described in Table II was subjected to x-ray analysis before and after the toluene extraction. The x-ray analysis showed the unextracted film to have a $K_x$ value of 0.46. The extracted film was found to have a $K_x$ value of 0.03. This x-ray data clearly shows that the beta-phase was preferentially removed by the toluene extraction.

The oxygen barrier properties of extracted films EB-0-B and EB-3-C were determined using an Ox-Tran 100 instrument from Modern Controls Incorporated of Oak River, Minnesota, and the procedure recommended for the instruments by the manufacturer. The EB-0-B film had a permeability of 30,800 cm³/m²/24 hours (65 barrers). The EB-3-C film was so permeable to oxygen that it exceeded the upper limit capability of the instrument with a permeability in excess of 88,000 cm³/m²/24 hours (greater than 200 barrers). These results show the porosity of the extracted films.

EXAMPLE 3

Figure 3:
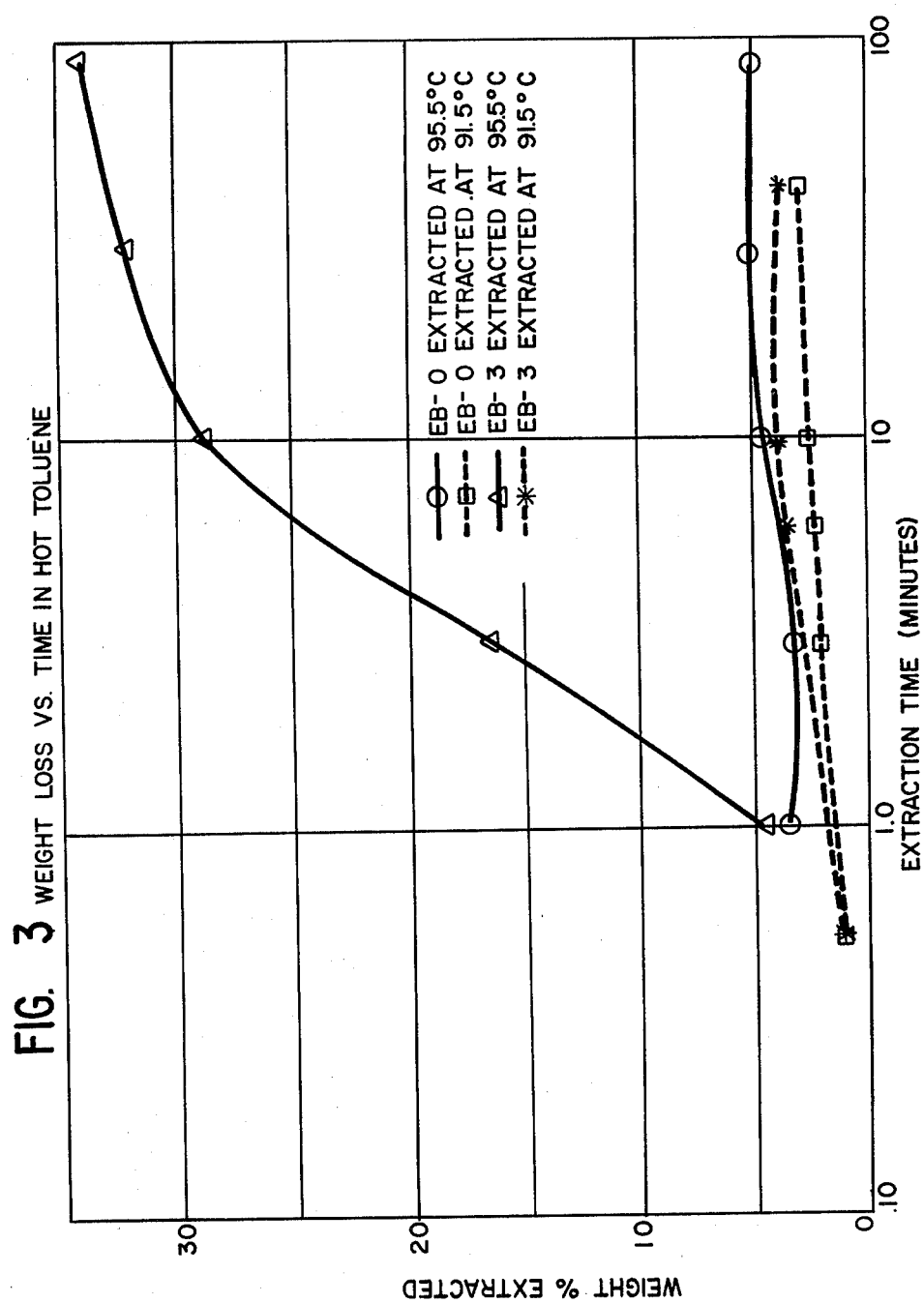
FIG. 3 shows data for weight loss of polymer with extraction time from Example 3.

Portions of samples EB-0 (containing no Q-dye) and EB-3 (containing $10^{-3}$ parts of Q-dye by weight per 100 parts by weight base resin) described in Example 1 were compression molded into 6 mil thick films as in Example 2. Sections of these films were extracted with toluene at 91.5° C. while other sections were extracted at 95.5° C. and the amount of polymer extracted was measured at different times. The results are given in Table V and are shown in FIG. 3.

TABLE V

| Sample No. | Extraction Temperature (°C.) | Extraction Time (minutes) | Amount of Polymer Extracted (Weight %) |
| --- | --- | --- | --- |
| EB-0 | 91.5 | 0.5 | 0.8 |
| EB-0 | 91.5 | 3 | 1.8 |
| EB-0 | 91.5 | 6 | 2.1 |
| EB-0 | 91.5 | 10 | 2.3 |
| EB-0 | 91.5 | 45 | 2.8 |
| EB-0 | 95.5 | 1.0 | 3.2 |
| EB-0 | 95.5 | 3 | 2.9 |
| EB-0 | 95.5 | 10 | 4.4 |
| EB-0 | 95.5 | 30 | 5.1 |
| EB-0 | 95.5 | 90 | 5.0 |
| EB-3 | 91.5 | 0.5 | 0.8 |
| EB-3 | 91.5 | 6.0 | 3.2 |
| EB-3 | 91.5 | 10 | 3.7 |
| EB-3 | 91.5 | 45 | 3.7 |
| EB-3 | 95.5 | 1.0 | 4.4 |
| EB-3 | 95.5 | 3 | 16.3 |
| EB-3 | 95.5 | 10 | 28.9 |
| EB-3 | 95.5 | 30 | 32.1 |
| EB-3 | 95.5 | 90 | 34.4 |

These results show that the amount of polymer which can be extracted from the films depends on the temperature of the extracting medium and on the amount of Q-dye added to the polymer.

EXAMPLE 4

Figure 4:
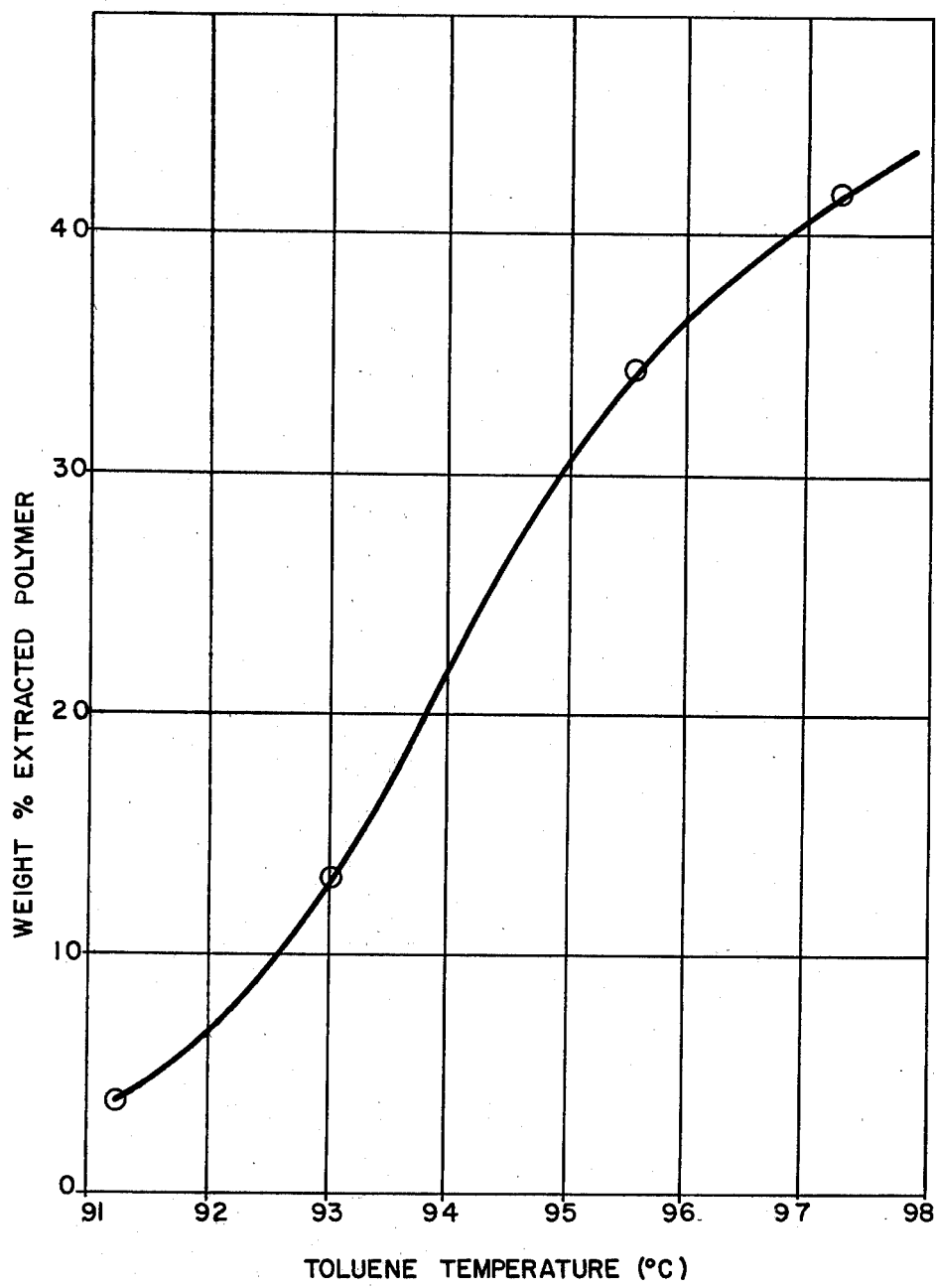
FIG. 4 shows data for weight loss of polymer with toluene temperature from Example 4.

Portions of film from sample EB-3 of Example 1 compression molded as in Example 2 were extracted by immersion in toluene for 15 minutes at various temperatures. The results from these extractions are given in Table VI and FIG. 4.

TABLE VI

| Toluene Temperature (°C.) | Polymer Extracted (Weight %) |
| --- | --- |
| 91.2 | 3.8 |
| 93.0 | 13.1 |
| 95.5 | 34.5 |
| 97.2 | 42.0 |

These results show that the quantity of polymer which can be extracted from the films is very dependent upon the temperature of the extracting medium. This allows the pore size, pore size distribution and pore volume to be modified by the extraction conditions.

EXAMPLE 5

Five film samples were compression molded as described in Example 2 from EB-3 of Example 1 which contained $10^{-3}$ parts by weight of Q-dye per 100 parts by weight of base resin. These film samples were designated EB-3-1, EB-3-2, EB-3-3, EB-3-4, and EB-3-5. Three of the film samples were extracted using hot toluene as follows:

| Sample | Toluene Temperature (°C.) | Time (minutes) |
| --- | --- | --- |
| EB-3-1 | 95.5 | 60 |
| EB-3-2 | 95.5 | 80 |
| EB-3-3 | 94 | 220 |

The moisture vapor transmission rates through all five films were determined according to ASTM E-96, procedure E (90% relative humidity, 100° F.). The results of these measurements are given in Table VII.

TABLE VII

| Sample | Weight[a] % Polymer Extracted | MVTR[b] | Thickness[c] |
| --- | --- | --- | --- |
| EB-3-1 | 26.7 | 2383 | 5.5 |
| EB-3-2 | 21.9 | 2430 | 5.5 |
| EB-3-3 | 16.5 | 758 | 4.5 |
| EB-3-4[d] | 0 | 3.67 | 5.5 |
| EB-3-5[d] | 0 | 5.52 | 5.0 |

[a]Percent of polymer sample removed with hot toluene.
[b]Moisture vapor transmission rate in grams per square meter in 24 hours.
[c]Thickness of film in mils.
[d]Unextracted film samples.

These results show the increase in permeability which results from selective extraction of the beta-spherulites.

These films were also subjected to qualitative filtration determinations by placing each of the extracted films in a Buechner funnel under house vacuum. It was found that liquid water would not filter through the films. Even the 1.6 mil thick film of Example 2 would not allow liquid water to pass through under house vacuum. In contrast, non-polar liquids such as hexane or toluene readily pass through the extracted films. The extracted films had an opaque, milky-white appearance apparently from light scattering due to the numerous voids. As soon as a non-polar liquid contacted the film, it became clear and transparent evidently due to the liquid filling the voids and minimizing the light scattering.

Figure 5:
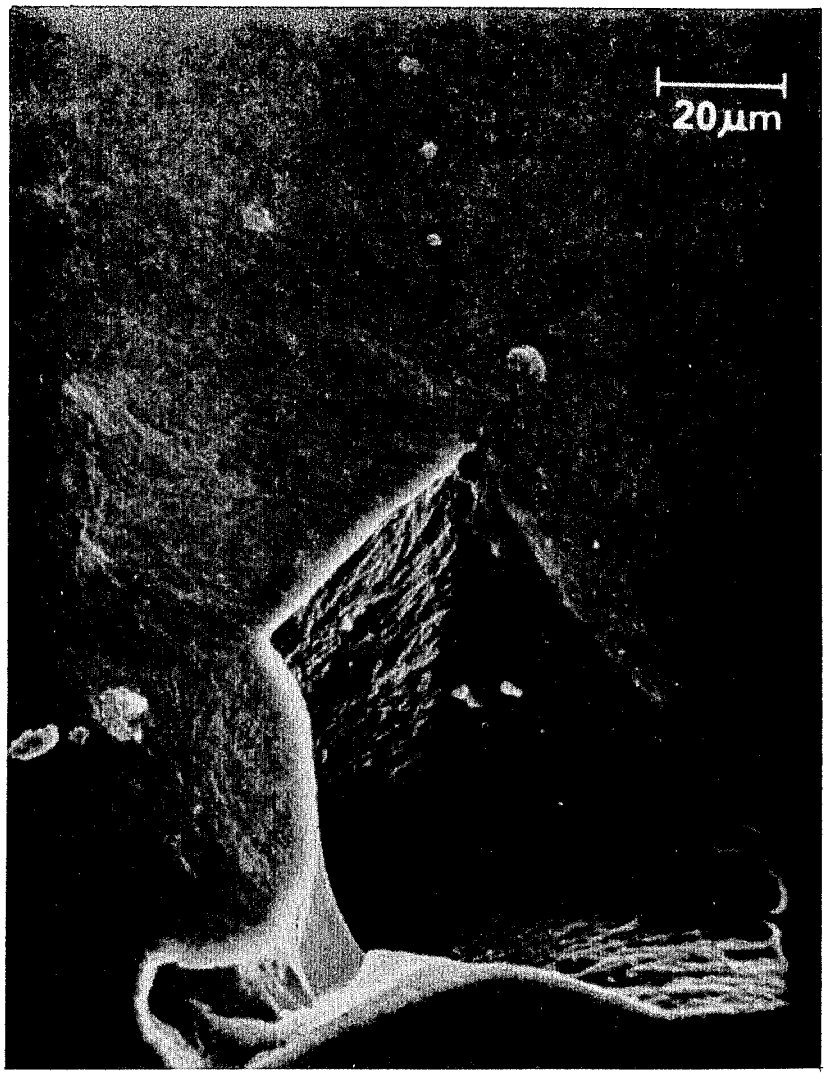
FIG. 5 is a photomicrograph of an extracted film sample showing the pores which have polygonal cross-sections.

A film prepared from resin sample PB-5 was extracted with toluene at 96° C. for 30 minutes. A portion of this film was prepared for the scanning electron microscope (SEM) by the usual techniques including coating with a 300 Å layer of gold. The SEM used was an ISI MSM-5 SEM. The sample was viewed at 700x magnification. A blowup of the resulting photomicrograph is given as FIG. 5. This photomicrograph clearly shows the polygonal pores and the selective extraction of the beta-spherulites.

EXAMPLE 6

A pelletized polypropylene homopolymer resin having a melt flow rate of about 9.6 g/10 min. and containing about 0.1 weight % BHT, about 0.15 weight % DSTDP, and about 0.075 weight % calcium stearate is used as a base resin. A masterbatch of the base resin and Q-dye is prepared by first powdering base resin in a Wiley mill and adding Q-dye at the rate of one pound of Q-dye per 10 pounds of base resin powder. This powder mixture is thoroughly blended in a tumbler type powder mixer. The resulting mixture is added to base resin pellets at the rate of one pound of powder mixture per 100 pounds of base resin pellets. This powder-pellets blend is passed two times through a 2.5 inch Killian double screw compounding extruder at about 226° C. and pelletized to give masterbatch pellets containing $10^{-1}$ parts by weight Q-dye per 100 parts by weight base resin.

The masterbatch pellets are combined with base resin pellets in a storage hopper at the rate of one pound of masterbatch pellets per 100 pounds of base resin. The resulting blend of pellets is fed into a 5 inch single screw extruder operated at about 210° C. The resulting polymer melt is fed to an upright annular film die which has a die gap of 100 mils. The melt is continuously extruded from the die to form a bubble and inflated by air to a blow-up ratio of 2.0 (initial bubble diameter to final bubble diameter). The expanding bubble is cooled with a stream of compressed air which issues from a cooling ring surrounding the bubble. The point of air impingement is about 2 inches from the die face; and, the air temperature is about 30° C. The combination of air velocity, air temperature and point of air impingement is controlled so that the rate of cooling of the polymer film allows beta-spherulites with average diameters greater than about 3 microns to form.

The expanded and cooled bubble or cylindrical tube travels into a V-shaped frame with flattening rolls which collapses the cylindrical tube into a flat tube. The flat tube passes between a set of nip rolls which operate at a speed sufficient to draw the film away from the die at a draw down ratio of about 50:1. The flat tube which is moving at the rate of about 30 feet per minute travels into an extraction vessel containing toluene at 95° C. The vessel contains an array of rollers which provides a path of sufficient length through the vessel that the film contacts the hot toluene for 2 minutes. The vessel is equipped with a cover and the film enters and exits the vessel through slits in the cover. The porous film passes into a hot, forced air drier to remove any toluene that is entrained in the porous film. Both the extraction vessel and the drier are contained in a vented area equipped with hydrocarbon recovery apparatus to minimize toluene vapor loss. A distillation tower is attached to the extraction vessel to allow the spent toluene (containing extracted resin) to be separated from the dissolved polymer and recycled back to the extraction vessel. The recovered polymer melt is recycled back and blended with fresh resin. The dried, porous film is passed to a take-up roll where it is collected.

The invention which is claimed is:

1. A porous film with a thickness of about 0.010 to about 0.25 millimeters comprising a resinous polymer of propylene having alpha-form spherulites and polygonal pores with average diameters of about 3 to about 100 microns said pores corresponding to the location of beta-form spherulites.

2. A porous film having polygonal pores with average pore diameters from about 3 to about 100 microns said film prepared from resinous polymers of propylene capable of having at least 40% crystallinity by a process comprising the steps of
    (a) dispersing in said resinous polymer a nucleating agent capable of producing beta-spherulites;
    (b) forming by extrusion a film with a thickness of about 0.010 to about 0.25 millimeters from the molten product of step (a);
    (c) cooling said film below the crystallization temperature of said polymer to form beta-spherulites; and
    (d) selectively extracting said beta-spherulites from the cooled film product of step (c) with an extracting solvent to form the porous film product.

3. A process for preparing a porous film having polygonal pores with average pore diameters from about 3 to about 100 microns from resinous polymers of propylene capable of having at least 40% crystallinity said process comprising the steps of
    (a) dispersing in said resinous polymer a nucleating agent capable of producing beta-spherulites;
    (b) forming by extrusion a film with a thickness of about 0.010 to about 0.25 millimeters from the molten product of step (a);
    (c) cooling said film below the crystallization temperature of said polymer to form beta-spherulites; and
    (d) selectively extracting said beta-spherulites from the cooled film product of step (c) with an extracting solvent to form the porous film product.

4. The process of claim 3 wherein said nucleating agent has the structural formula

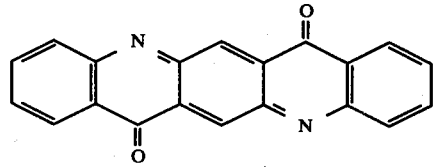

5. The process of claim 1 wherein said extracting solvent is selected from the group consisting of toluene, carbon tetrachloride, or xylene.

6. The process of claim 3 wherein at least 50 percent of the pores of said porous film have an average diameter greater than 5 microns.

7. A process for preparing a porous film from resinous polymers of propylene capable of having at least 40% crystallinity said process comprising the steps of
    (a) dispersing in said resinous polymer a nucleating agent capable of producing beta-spherulites;
    (b) forming by extrusion a film with a thickness of about 0.010 to about 0.25 millimeters from the molten product of step (a);
    (c) cooling said film below the crystallization temperature of said polymer to form beta-spherulites; and
    (d) contacting the film of step (c) with an extracting solvent at a temperature of about 95° C. to about 100° C. to selectively extract at least a portion of said beta-spherulites to form the porous film having polygonal pores with average pore diameters from about 3 to about 100 microns.

* * * * *